May 26, 1959     A. H. CARPENTER     2,888,331
TESTING DEVICE
Filed Dec. 27, 1954

INVENTOR
Arthur H. Carpenter
BY
ATTORNEYS

United States Patent Office 2,888,331
Patented May 26, 1959

2,888,331

TESTING DEVICE

Arthur H. Carpenter, Newman, Calif., assignor by decree of distribution to Virginia C. Carpenter, Newman, California Application December 27, 1954, Serial No. 477,785

6 Claims. (Cl. 23—253)

This invention relates to engine-block testing devices, and particularly to one usable in connection with any liquid-cooled internal combustion engine.

Any such engine may in time develop a crack in the head or cylinder block, in the area thereof exposed to the explosive gases, or in the head gasket between the interior of any cylinder and the communicating water or other coolant passages connecting the head and cylinder block. When such a condition occurs, a certain amount of the high-pressure gases created by the firing of the fuel mixture in the cylinders, finds its way through the cracks in the block, or past a defective head gasket, and into the cooling liquid, with which the gases then travel until they ultimately reach the water intake opening at the top of the radiator.

Ordinarily, the existence of such a cracked condition or defective head gasket, is not known until engine operation, due to water leakage into the engine, has deteriorated to such an extent that the engine is ruined or requires extensive repairs.

At present, the existence of cracks in the block or head of an engine, or of a defective head gasket, can only be determined by taking the engine down, and making an exhaustive inspection. This is an expensive procedure, and if no defective condition of the kind being searched for exists, the expense involved is wholly lost.

It is therefore the principal object of my invention to provide a device by means of which a test for the above named defects can be carried out in a matter of minutes on any engine in running condition, and without any tearing down of the engine being necessary.

Another object is to provide a portable unitary device for the purpose which will indicate the results of the test in a visual manner, and so that the operator can note the results from any stand he may assume adjacent the engine.

A further object of the invention is to provide a device for the purpose arranged to be detachably engaged in sealing relation with the water intake opening of the radiator in such a manner as to be directly acted on by any gases leaving the water at that point.

An additional object is to provide a testing device which is especially adapted, but not limited for use in connection with automobile or truck engines of water cooled type.

Still another object of the invention is to provide a testing device which is designed for ease and economy of manufacture.

It is also an object of the invention to provide a practical and durable testing device, and one which will be exceedingly effective for the purpose for which it is designed.

These objects are accomplished by means of such structure and relative arrangement of parts as will fully appear by a perusal of the following specification and claims.

Figure 1:
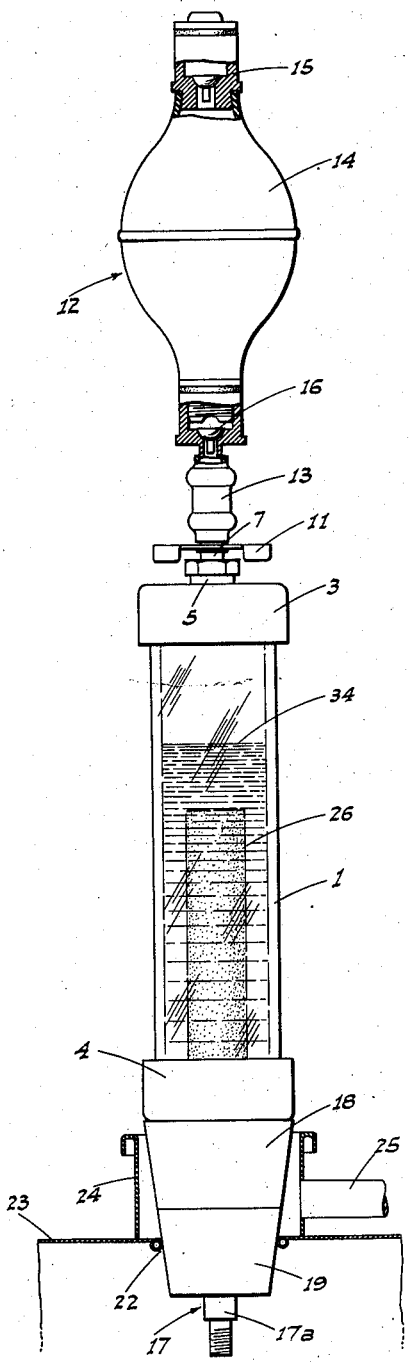
Fig. 1 is an elevational view of the improved testing device, partly broken out and in section, and showing said device as in operation.
Figure 2:
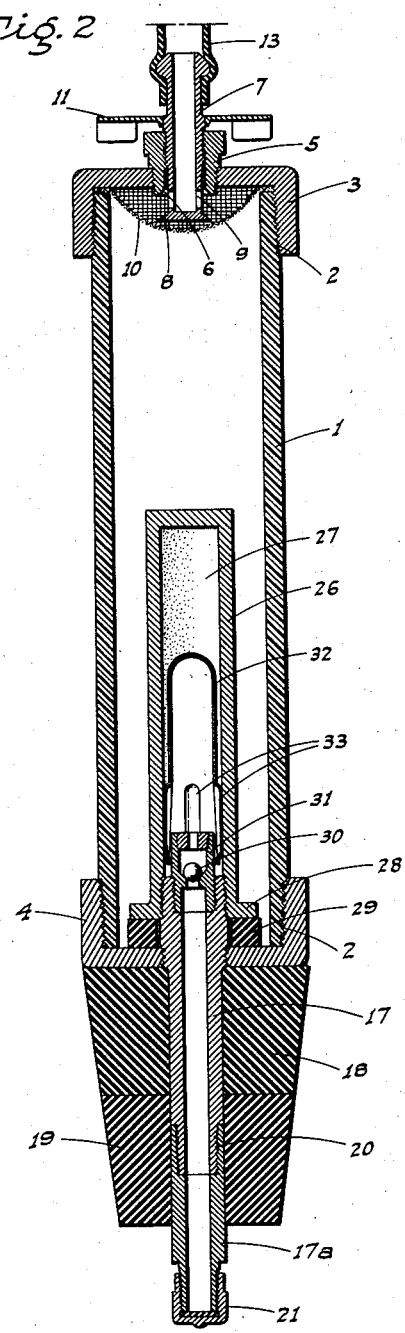
Fig. 2 is an enlarged sectional elevation of the device, with the vacuum-creating bulb omitted.

Referring now more particularly to the characters of reference on the drawings, the device comprises a transparent tube 1, preferably made of a suitable plastic which is impervious to the action of any of the chemicals used or apt to be encountered in the use of the device, and which may be readily cleaned, particularly on the inside, with a standard cleansing agent.

The ends of the tube 1 are threaded as at 2, and are screwed with a liquid tight fit into top and bottom caps 3 and 4 respectively; said tube and the caps forming a closed chamber. A bushing 5 is secured in the top of cap 2, the bushing being provided at its lower end with an upwardly facing valve seat 6. A tubular stem 7 is adjustably screwed into the bushing and is formed on its lower end with a head 8 adapted to cooperate with seat 6 when the stem is moved up to its limit. The lower end of the stem is closed, but access to the interior thereof is provided by holes 9 in the sides of the stem immediately above the head 8. A screen 10 is mounted under the cap 3 and below the valve, and is held in place between the tube 1 and cap 3.

Above bushing 5, a cross bar 11, forming a stem-turning handle, is secured on the stem 7, and the stem at its upper end is connected to the lower end of a standard or conventional squeeze-bulb unit 12 by a short flexible tubular coupling 13. Unit 12 includes, above and below the squeeze-bulb 14 thereof, normally closed upwardly opening check valves 15 and 16 respectively, so that upon squeezing the bulb 14, air within the bulb is forced out past valve 15, and upon releasing the squeezing pressure, air or other gas is drawn into the bulb from the interior of the tube 1 past valve 16, if the valve 8 is open, creating a tendency to vacuum within the chamber of tube 1.

A tubular stem 17 of relatively small dimensions, is secured in and depends from cap 4, and mounted on said stem are vertically thick rubber stoppers 18 and 19 of gradually tapered form in a downward direction. The stoppers are separable from each other, and the stem 17 includes an extension 17a which is detachably screwed into the main portion of the stem within stopper 19 as shown at 20. Extension 17a projects below stopper 19 a distance and is threaded to removably receive a closure cap 21.

The threading on the lower end of the main stem 17 is the same as that on the lower end of the extension 17a, so that cap 21 may be mounted on said stem when the extension and the lower stopper 19 are removed.

Said lower stopper is of a size to wedgingly engage in the intake opening 22 formed in the top of a radiator reservoir 23 of the cooling system of a passenger vehicle, or any similar relatively small internal combustion engine unit. This opening is at the bottom of the water intake neck 24 of the reservoir, on which the usual closure cap is removably mounted; said opening being below the overflow tube 25 from said neck.

The varying size of stopper 19 between its ends is sufficient to take care of passenger vehicles and the like of different makes, but if truck and similar large engine units are to be tested, said lower stopper and stem extenion 17a are removed to enable the larger upper stopper 18 to engage in the correspondingly large water intake openings of such latter engine units.

The upper end of stem 17 projects into tube 1 a short distance, and screwed onto said upstanding end is an upstanding cylindrical member 26 formed with an interior cavity 27 closed at its upper end, and with an outwardly projecting base flange 28 seated on a sealing washer 29 surrounding stem 17 within cap 4. The member 26 is made of porous brass or similar material having a porosity of approximately ten microns.

An upwardly opening ball check valve 30, and which includes a body 31, is mounted in the upper end of stem 17 and opens into the cavity 27. A non-porous elongated hood 32 extends upwardly into cavity 27 above body 31 and is removably held in place by ribs 33 on the hood engaging the inner wall of cavity 27 without interfering with the flow of gas from the check valve into said cavity from the lower end of the hood. The hood however forms an air pocket to prevent the liquid solution (later described) in tube 1 from entering valve body 31 and reaching the valve 30. Also, confined pressure within the hood tends to hold the valve closed.

The tube 1 is filled to a level some distance above the member 26 with a liquid solution indicated at 34, and which is of a nature which has a chemical reaction, of a visible nature, to the presence of $CO_2$ or $CO$ gases. The solution preferably used is formed of equal parts of barium hydroxide and calcium hydroxide, dissolved in distilled water. A similar quantity of common salt (sodium chloride) is preferably included in the solution not only to maintain the other ingredients in suspension in the solution and prevent the settling of the same, but also imparts an unpleasant taste to the otherwise tasteless solution which being poisonous could possibly be mistaken for drinking water.

While the above ingredients are preferably the ones employed in the solution because of their cheapness, other compositions such as barium hydroxide with phenolphthalein in alcohol solution, or Nile Blue A in alcohol with sodium hydroxide, may be used instead.

In operation, with the engine being tested running, cap 21 (which is merely a protector against possible leakage of solution from tube 1 or the entry of dirt etc., into stem 17) is removed, valve 8 is opened, and either stopper 18 or 19 engaged in opening 22. This seals the reservoir 23 from the overflow 25, and makes the reservoir pressure-tight, so that any gaseous pressure within the reservoir can only leave the same by passing up the tubular stem 17.

Present day engine cooling systems are designed to operate under a pressure of approximately five pounds or over, so that there is ample pressure—in the gases or vapors released from the system and passing up the stem 17—to open the check valve 30; such gases or vapors entering the cavity 27, and percolating through the porous brass member 26. Due to the extremely fine porosity of the material of which member 26 is made, the gases or vapors passing through the same are broken into very fine particles, and discharge into the surrounding liquid solution in the form of minute bubbles. If these bubbles are air, they will pass up through the liquid without affecting the same, and will then escape through the bulb unit 12 to the atmosphere. If, however, the bubbles contain $CO_2$ or $CO$ caused by the gases of combustion bleeding into the cooling water by reason of a cracked head or cylinder block, or a defective head gasket, the passage of such bubbles through the liquid solution produces a chemical reaction therein, and which reaction is reflected by the solution immediately becoming cloudy or milky in appearance, instead of its normally clear condition, indicating the existence of such crack or defect.

Since the tube 1 is transparent and upstands from the radiator reservoir, the operator can note the results of the test from any point adjacent the engine being tested.

If the pressure in the cooling system is relatively low for any reason, so that a sluggish movement of the gases through the member 26 results, the bulb 14 is squeezed and then released. This will establish a relatively low pressure within the tube 1, which in effect increases or builds up the pressure in reservoir 23, and causes the gas bubbles to pass through the member 26 with the desired rapid motion.

When the test results in a positive reaction, a scum will be formed on the wall of tube 1 and member 26, and the parts must be cleaned out and the solution replaced with a fresh supply. Due to the screw connections used between the parts of the device, it is easy to take the device apart for cleaning.

With the described device, a repairman, or a used car dealer or appraiser, can make an effective test—for the purpose described—without any dismantling of the engine, with its attendant cost; the test being accomplished quickly and conveniently, and yet very reliably.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for testing a liquid-cooled internal combustion engine for leakage of gas from the engine combustion chamber into the liquid of the cooling system of the engine, the device comprising a closed vertical chamber having a top outlet, and including a transparent portion below the outlet, a porous member mounted in the chamber, a chemical solution in the chamber outside said member of a nature reacted upon by combustion gases from within the engine, the member being immersed in the solution, a rigid tubular stem depending from the chamber in communication with the lower end of the porous member and open on its lower end, and a taper stopper on the stem adapted for sealing engagement with the water intake opening of the cooling system of the engine; the porous member being of elongated form upstanding from the bottom of the chamber and having an upwardly extending cavity closed at its upper end; the tubular stem communicating at its upper end with the cavity at the lower end thereof, and an upwardly opening normally closed check valve on the upper end of the stem within the cavity.

2. A device for testing a liquid-cooled internal combustion engine for leakage of gas from the engine combustion chamber into the liquid of the cooling system of the engine, the device comprising a closed vertical chamber having a top outlet, and including a transparent portion below the outlet, a porous member mounted in the chamber, a chemical solution in the chamber outside said member of a nature reacted upon by combustion gases from within the engine, the member being immersed in the solution, a rigid tubular stem depending from the chamber in communication with the lower end of the porous member and open on its lower end, and a taper stopper on the stem adapted for sealing engagement with the water intake opening of the cooling system of the engine; the porous member being of elongated form upstanding from the bottom of the chamber and having an upwardly extending cavity closed at its upper end; an upwardly opening check valve unit connected to and upstanding from the upper end of the stem, the unit including a body projecting into the cavity in clearance relation, and a non-porous hood within the cavity mainly above the body and depending below the upper end thereof in clearance relation to said body and to the sidewall of the cavity.

3. A device for testing a liquid-cooled internal combustion engine for leakage of gas from the engine combustion chamber into the liquid of the cooling system of the engine, the device comprising a closed chamber which includes a transparent portion and a top outlet for the free escape of gas, a tubular stem depending from the chamber, means to connect said stem below the chamber in sealing relation with the liquid intake opening of the cooling system above the level of the cooling liquid therein, the stem being arranged to feed into the chamber, an upwardly opening check valve mounted in connection with the stem and arranged to prevent a downward flow into the upper end of the stem, and a chemical solution in the chamber having a working level above that of the check valve, said solution being of a nature such that combustion gas passing through the solution from the check valve will cause a reaction in said solution to change the normal appearance thereof.

4. In combination with the water-intake neck of the cooling-water radiator of a water-cooled internal combustion engine, a combustion-gas leakage testing device comprising a vertical chamber having a top outlet for the escape of gas and formed with a transparent portion, a chemical solution in the chamber of a nature such as to be changed in appearance upon such gas coming in contact therewith, a tubular stem opening into the chamber and depending therefrom, a stopper on the stem below the chamber engaged in sealing relation with the radiator neck, and means between the upper end of the stem and the interior of the chamber and below the level of the solution to prevent downward flow of the solution into the tube without preventing upward movement of the gas into the chamber and through the solution therein.

5. A combination, as in claim 4, in which the last named means includes an upwardly opening check valve.

6. A combination, as in claim 4, in which the last named means includes a porous member extending over the upper end of the stem and sealed at its lower end about the stem.

References Cited in the file of this patent

UNITED STATES PATENTS

| | | | |
|---|---|---|---|
| 1,321,062 | Lamb | Nov. 4, | 1919 |
| 1,567,534 | Maude | Dec. 29, | 1925 |
| 1,987,486 | Michaelis | Jan. 8, | 1935 |
| 2,017,951 | Dasher | Oct. 2, | 1935 |
| 2,212,466 | Bradford | Aug. 20, | 1940 |
| 2,485,739 | Johnstone | Oct. 25, | 1949 |
| 2,517,382 | Brinker | Aug. 1, | 1950 |
| 2,534,830 | Philo | Dec. 19, | 1950 |
| 2,569,895 | Smith | Oct. 2, | 1951 |
| 2,600,158 | Clothier | June 10, | 1952 |
| 2,610,107 | Dreher | Sept. 9, | 1952 |

OTHER REFERENCES

"Qualitative Chem. Anal.," Presscott and Johnstone, pages 260–262, 5th ed. (1901), D. Van Nostrand Co.

Fisher: "Lab. Appliances," 1934, pages 508–9, Fig. 740 and 9–753.